United States Patent Office 3,386,357
Patented June 4, 1968

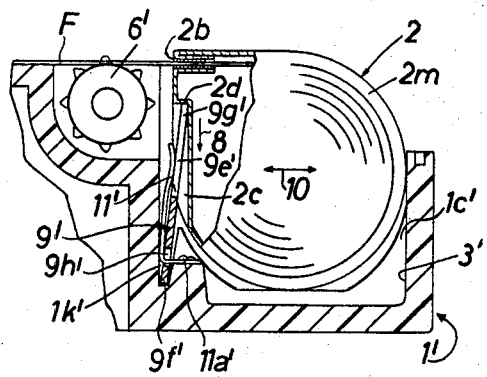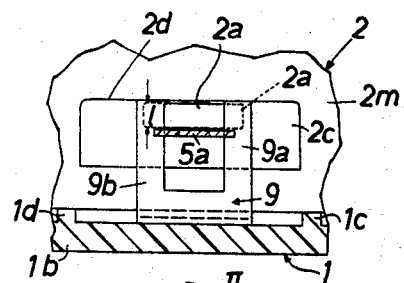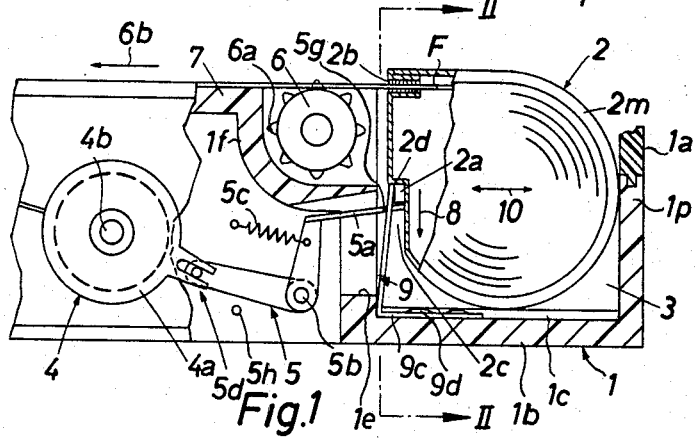

3,386,357
PHOTOGRAPHIC CAMERA WITH BUILT-IN LIGHT METER
Rudolf Kremp, Grunwald, Munich, and Alfred Winkler, Heinz Ernst, Dieter Engelsmann, and Kurt Zattler, Munich, Germany, assignors to Agfa Aktiengesellschaft, Leverkusen, Germany, a corporation of Germany
Filed May 3, 1965, Ser. No. 452,583
Claims priority, application Germany, May 8, 1964, A 45,991
15 Claims. (Cl. 95—10)

ABSTRACT OF THE DISCLOSURE

A photographic camera which is used with supply cartridges having thereon a pair of stops spaced from each other by a distance which is indicative of the sensitivity of film in the cartridge. A yieldable locating member which is permanently installed in the chamber for the cartridge is engaged by one of the stops when the cartridge is properly inserted into the chamber. The other stop is engaged by a sensing element which adjusts the light meter as a function of film sensitivity.

---

The present invention relates to photographic cameras of the type having a built-in light meter or exposure meter, and more particularly to improvements in photographic cameras of the type wherein the initial setting of a movable portion of the light meter is indicative of the film speed. Still more particularly, the invention relates to improvements in photographic cameras of the type wherein the film supply cartridge automatically adjusts the movable portion of the light meter so that the setting of such movable portion corresponds to the speed of that film which is stored in the cartridge.

It is already known to provide a photographic camera with a sensing mechanism which selects the initial setting of a movable portion of the light meter in such a way that the selected setting corresponds to the speed or sensitivity of the film which is stored in a cartridge, and it is also known to place an element of the sensing mechanism into the path of a film supply cartridge so that the sensing mechanism transmits motion to and selects the initial setting of the movable portion of the light meter in automatic response to insertion of the cartridge. A serious drawback of such cameras is that the initial setting of the movable portion of the light meter is not in exact conformity with the actual speed of the film if the cartridge is not produced with requisite precision and/or if the cartridge is not inserted with utmost accuracy. As a rule, the sensing mechanism is actuated by a projection or stop which forms part of or is attached to the mantle or shell of a film supply cartridge and, therefore, any slight inaccuracies in dimensioning and/or positioning of the mantle will result in inaccurate setting of the movable portion of the light meter. When inserted into the housing of a photographic camera, the cartridge is normally biased by a spring or the like so that it abuts against a fixed part and, if the dimensions of the cartridge deviate from a predetermined value, the projection will fail to reach the sensing mechanism or will adjust the position of the sensing mechanism, and hence the movable portion of the light meter, in a way which does not reflect with sufficient accuracy the speed of the film in the freshly inserted cartridge.

Accordingly, it is an important object of the present invention to provide a photographic camera with built-in light meter which is constructed and assembled in such a way that a freshly inserted film supply cartridge is invariably held in an optimum position so that the automatic adjustment of the light meter will invariably and accurately reflect the speed of the film in such cartridge.

Another object of the invention is to provide a novel locating or positioning structure for use in a photographic camera of the just outlined characteristics and to construct the locating structure in such a way that one or more of its component parts invariably fix or locate a freshly inserted film supply cartridge in an optimum position for adjustment of the initial position of the movable portion of the light meter.

An additional object of the invention is to provide an improved film supply cartridge which may be used in such photographic cameras.

Still another object of the invention is to provide an improved film supply cartridge which may be used in such photographic cameras.

Still another object of the invention is to provide a photographic camera wherein the movable portion of the built-in light meter is properly adjusted to take into consideration the speed of the freshly inserted film regardless of any small, or even pronounced, deviation of the dimensions of a film supply cartridge from an optimum standard value.

A concomitant object of the invention is to provide a sensing mechanism one element of which is either guided by or serves to guide the locating or positioning structure which places a freshly inserted film supply cartridge in an optimum position with reference to the camera housing.

A further object of the instant invention is to provide a still camera wherein the locating or positioning structure for the film supply cartridge occupies a minimum of space and wherein the space occupied by such locating structure is available regardless of whether or not the camera embodies the locating structure.

Another object of the invention is to provide a still camera wherein the locating or positioning structure for the film supply cartridge is mounted and assembled in such a way that its sensitive component or components cannot be damaged or deformed in response to repeated insertion and/or removal of cartridges.

Briefly stated, one feature of our invention resides in the provision of a photographic camera which comprises a housing defining an internal chamber accessible upon removal or in response to pivoting of the rear wall or another movable portion of the housing, a locating member mounted in the housing and having a resilient or spring-biased end portion extending into the chamber, a film supply cartridge removably received in the chamber and comprising a mantle or shell having a pair of stops spaced from each other by a distance which is indicative of the speed (i.e., sensitivity) of the film which is stored in the cartridge and one of these stops automatically abutting agianst the end portion of the locating member when the cartridge is properly accommodated in the chamber, a light meter or exposure meter provided in the housing and having a portion movable to and from a plurality of different initial or starting positions each of which is characteristic of a different film speed, and a transmission comprising a sensing element or feeler movably mounted in the housing and operatively connected with the movable portion of the light meter. The sensing element extends into the path of and is movable by the other stop of the mantle to place the movable portion of the light meter into such initial position which accurately reflects the speed of film in the cartridge when the end portion of the locating member abuts against the corresponding stop.

The novel features which are considered as characteristic of the invention are set forth in particular in the appended claims. The improved photographic camera itself, however, both as to its construction and its mode of operation, together with additional features and advantages thereof, will be best understood upon perusal of the following detailed description of certain specific embodiments with reference to the accompanying drawings, in which:

FIG. 1 is a fragmentary horizontal section through a still camera which is constructed and assembled in accordance with a first embodiment of our invention;

FIG. 2 is a fragmentary transverse vertical section as seen in the direction of arrows from the line II—II of FIG. 1; and FIG. 3 is a fragmentary horizontal section through a modified still camera.

Referring first to FIG. 1, there is shown a portion of a still camera which comprises a housing 1 defining a chamber 3 which accommodates a removable film supply cartridge 2. The chamber 3 is accessible to the user upon bodily removal or in response to pivoting of a rear wall 1a. The cartridge 2 accommodates a supply of perforated roll film F and comprises a mantle or shell 2m having a mouth 2b through which the film F may be withdrawn in such a way that a portion thereof extends tangentially of a sprocket 6 forming part of the film transporting mechanism. The teeth 6a of the sprocket 6 enter the perforations of the film F so that the latter is positively advanced in a direction indicated by the arrow 6b when the sprocket 6 is driven to rotate in a counterclockwise direction, as viewed in FIG. 1, whereby the film is collected by a suitable take-up spool, not shown.

The mantle 2m of the cartridge 2 comprises two projections or stops 2a, 2d spaced from each other by a distance l (see FIG. 2) which is indicative of the speed (i.e., sensitivity) of the film F. When the chamber 3 is accessible, the cartridge 2 may be inserted or withdrawn by moving in and counter to the direction indicated by an arrow 8. In the properly inserted position of FIG. 1, the stop 2d abuts against the end portions or tips of two prongs or legs 9a, 9b (see FIG. 2) forming part of a substantially L-shaped locating or positioning member 9 which is mounted in the housing 1 in such a way that at least the end portions of its prongs 9a, 9b extend into the chamber 3. The prongs 9a, 9b are of identical length. The means for securing the front leg 9c of the locating member 9 to the housing 1 comprises one or more rivets 9d or other suitable fasteners. It is also possible to utilize a suitable adhesive. In the embodiment of FIGS. 1 and 2, the locating member 9 is a leaf spring whose prongs 9a, 9b tend to move in a direction to the right, as viewed in FIG. 1, and to bear against the left-hand face of the stop 2a. Suitable ribs 1c, 1d or similar abutments are provided on the front wall 1b of the housing 1 and extend into the chamber 3 to assist the locating member 9 in properly fixing the cartridge 2 in such a way that the mouth 2b is closely adjacent to the sprocket 6. That portion of the film F which has advanced beyond the sprocket 6 lies flat against the rear face of a frame 7 forming part of the housing 1 and defining an exposure opening (not shown) through which light coming from the viewed scene or object may reach the film. The film F is pressed flat against the rear face of the frame 7 by one or more pressing plates (not shown) which are mounted on the rear wall 1a in a manner known from the art of conventional still cameras.

The camera of our invention further comprises a built-in light meter or exposure meter 4 having a movable portion 4a which, in the present instance, is arranged to rotate about a fixed vertical axis defined by a spindle 4b so that it may move to and from a large number of initial or starting positions each of which is characteristic of a different film speed. The means for selecting such initial position of the movable portion 4a which is indicative of the speed of the film F in the cartridge 2 comprises a transmission 5 including a sensing element 5a here shown as a two-armed lever which is rockable about a fixed vertical pivot 5b and is biased by a helical spring 5c so that it normally tends to rotate in a counterclockwise direction when the cartridge 2 is inserted in the direction indicated by the arrow 8. This right-hand arm of the sensing element 5a extends through a cutout 1e provided in an internal partition 1f of the housing 1, and its tip is formed with a pair of lateral cutouts 5g (one shown in FIG. 1) each of which receives and guides a portion of the corresponding prong 9a, 9b in a manner as indicated in FIG. 2. Thus, the sensing element 5a actually holds the prongs 9a, 9b against excessive movement in a direction to the right, as viewed in FIG. 1. This is important because the end portions of the prongs 9a, 9b are thereby held in the path of the stop 2d but cannot obstruct the entry of the stop 2a into abutment with the tip of the sensing element 5a. The locating member 9 could break or could undergo excessive deformation if its prongs 9a, 9b were permitted to extend too far into the chamber 3. However, it is clear that the means for preventing excessive penetration of prongs 9a, 9b into the chamber 3 may comprise one or more guide members which need not be connected to or carried by the sensing element 5a.

FIG. 2 shows that the stop 2d is formed by a shoulder bounding one side of a shallow recess or depression 2c provided in that side of the mantle 2m which faces the sprocket 6 and the cutout 1e. The stop 2a is a projection or protuberance which is provided in the recess 2c and whose front face (i.e., that face which is turned toward the front wall 1b of the housing 1) comes in actual engagement with the tip of the sensing element 5a.

The camera of FIGS. 1 and 2 is manipulated as follows:

When the rear wall 1a is removed or is pivoted with reference to the remainder of the housing 1 to such an extent that the rear side of the chamber 3 is exposed, the user can insert a fresh film supply cartridge 2 in a direction as indicated by the arrow 8. The cartridge is inserted in such a way that the mouth 2b of the mantle 2m is placed in immediate proximity of the sprocket 6 whereby the leading end of the film F extends substantially tangentially of the sprocket and the nearest teeth 6a enter the adjoining perforations so that the film is properly coupled to the transporting mechanism. Such transporting mechanism may comprise a rotary knob or a lever, not shown.

The prongs 9a, 9b of the locating member 9 extend into the chamber 3 and are held in the lateral cutouts 5g of the sensing element 5a so that they remain in the path of the stop 2d. When the stop 2d abuts against the end portions of the prongs 9a, 9b and the mantle 2m also abuts against the ribs 1c, 1d of the housing 1, the cartridge 2 is properly inserted in the chamber 3 and the sensing element 5a automatically assumes an angular position which reflects, with great accuracy, the exact speed of the film F. The transmission 5 automatically selects the initial position of the movable portion 4a by rotating this portion 4a about the axis of the spindle 4b so that the initial setting of the light meter 4 reflects, with utmost accuracy, the exact speed or sensitivity of the film F in the freshly inserted cartridge 2. A suitable post 5h or another arresting device may be provided in the path of the sensing element 5a to limit the counterclockwise movement of this element under the bias of the spring 5c when the cartridge 2 is removed from the chamber 3. When the sensing element 5a abuts against the post 5h, the movable portion 4a of the light meter 4 is compelled to assume an extreme end position.

It will be seen that, by the simple expedient of providing a locating member 9 which compels the front face of the stop 2a to assume a position in which the sensing element 5a is rocked through a predetermined angle, the initial position of the movable portion 4a invariably reflects the exact speed of the film F even if the cartridge 2 has some freedom of movement in directions indicated by the double-headed arrow 10. Such movements will take place if the mantle 2m is not produced or dimensioned with utmost precision. In the absence of the locating member 9, the cartridge 2 could eventually turn in a counterclockwise direction, as viewed in FIG. 1, and the spatial position of the stop 2a would fail to reflect the exact speed of the film F in the cartridge 2. Clockwise angular displacement of the cartridge 2 is prevented by the rear wall 1a when the latter is moved to its closed or sealing position.

If the cartridge 2 has some freedom of movement in the directions indicated by the arrow 10, the end portions of the prongs 9a, 9b will follow but will remain in abutment with the flat front face of the stop 2d. For all practical purposes, the curvature of the small arc along which the end portions of the prongs 9a, 9b travel when the cartridge 2 "wobbles" in directions indicated by the arrow 10 is negligible so that the stop 2a will continue to maintain the tip of the sensing element 5a in a position which reflects, with sufficient accuracy, the exact speed of the film F. If the mantle of a cartridge is dimensioned in such a way that its recess is nearer to the partition 1f than the recess 2c shown in FIG. 1, the prongs 9a, 9b will be flexed to the left but their end portions will remain in abutment with the stop 2d. The prongs 9c, 9d actually bias the cartridge 2 in a sense to keep the mantle 2m in abutment with the portion 1p of the housing 1 and thereby prevent wobbling of the cartridge when the rear wall 1a returns to closed position.

A cartridge containing a film whose speed is different from the speed of the film F shown in FIG. 1 will be constructed and dimensioned in exactly the same way as the cartridge 2 excepting that the distance *l* between the stops 2a, 2d is different. The position of the stop 2d remains unchanged but the stop 2a will be located nearer to or at a greater distance from the stop 2d. In other words, the position of the stop 2d with reference to the remainder of a cartridge will be the same regardless of the speed of the film.

FIG. 3 illustrates a modified still camera comprising a housing 1' which defines a chamber 3' for a cartridge 2 which is identical with the cartridge shown in FIGS. 1 and 2. The film F is again transported by a sprocket 6' which is closely adjacent to the mouth 2b, but the locating member 9 of FIGS. 1 and 2 is replaced by a composite two-piece locating member 9' which includes a substantially rigid plate 9e' having a front edge portion 9f' which is rockable in a bearing 1k' resembling a knife-edge bearing and forming part of or being secured to the housing 1'. The slot defined by the bearing 1k' diverges rearwardly (i.e., upwardly, as viewed in FIG. 3) and allows the plate 9e' to rock within limits so that its rear end portion remains in abutment with the stop 2d. This rear end portion may constitute the tip or tips of one or more rigid prongs 9g' which are biased into the recess 2c by an L-shaped leaf spring 11' constituting the second component of the locating member 9'. The rearwardly extending leg of the spring 11' bears against the plate 9e' and its other front leg extends through a suitable cutout 9h' in the plate 9e' and is secured to the housing 1', as at 11a'. Thus, the plate 9e' is actually coupled to and is rockably supported by the shorter front leg of the spring 11'. The stop 2d is not shown in FIG. 3 because its configuration and positioning are the same as described in connection with FIGS. 1 and 2. The housing 1' comprises one or more arcuate ribs 1c' which arrest the mantle 2m and cooperate with the end portions of the prongs 9g' to fix the cartridge 2 in an optimum position in which the sensing element 5a (not shown in FIG. 3) will select the initial position of the movable member 4a in such a way that the setting of the light meter 4 will again reflect the exact speed of the film F.

The extent to which the plate 9e' may be tilted in the bearing 1k' is selected in such away that the prongs 9g' cannot obstruct insertion of the cartridge 2 (arrow 8) so that the plate 9e' cannot be damaged or deformed in response to repeated insertion and removal of cartridges. However, it is clear that the plate 9e' can be guided by the sensing element 5a in the same manner as described in connection with FIGS. 1 and 2; in such cameras, the bearing 1k' may be so formed that the plate 9e' will have greater freedom of movement about its front edge portion 9f'.

In both illustrated embodiments of our invention, the end portions of the prongs or legs 9a, 9b and 9g' are movable in a plane which is substantially parallel with the flat front face of the stop 2d so as to remain in engagement with such front face even if the cartridge 2 has some freedom of movement in directions indicated by the arrow 10. As stated before, the end portions of the prongs 9a, 9b and 9g' will move in an arcuate plane because the front leg 9c of the locating member is fixed to the front wall 1a and because the front edge portion 9f' of the plate 9e' is pivotable in the bearing 1k'. However, the curvature of such arcuate plane is so negligible that the latter can be said to coincide with the plane of the front face on the stop 2d.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be secured by Letters Patent is:

1. In a camera, a housing defining a chamber; a locating member movably mounted in said housing and permanently extending into said chamber; a film supply cartridge removably received in said chamber and comprising a mantle having a pair of stops spaced from each other by a distance which is indicative of the speed of film in said cartridge, one of said stops abutting against said locating member in response to proper insertion of said cartridge into said chamber; a light meter provided in said housing and comprising a portion movable to and from a plurality of initial positions each of which is characteristic of a different film speed; and a transmission comprising a sensing element movably mounted in said housing and operatively connected with said movable portion, said element extending into the path of and being movable by the other of said stops to place said movable portion into such initial position which accurately reflects the speed of film in said cartridge when said locating member abuts against said one stop.

2. In a camera, a housing defining a chamber; a locating member yieldably mounted in said housing and permanently extending into said chamber; a film supply cartridge removably received in said chamber and comprising a mantle having a pair of stops whose position with reference to each other is indicative of the exact speed of film in said cartridge, one of said stops abutting against said locating member in response to proper insertion of said cartridge into said chamber; a light meter provided in said housing and comprising a portion movable to and from a plurality of initial positions each of which is characteristic of a different film speed; and a transmission comprising a sensing element movably mounted in said housing and operatively connected with said movable portion, said element extending into the path of and being movable by the other of said stops to place said movable portion into such initial position which accurately reflects the speed of film in said cartridge when said locating member abuts against said one stop.

3. In a camera, a housing defining a chamber; a locating member comprising a leaf spring mounted in said housing and having at least one leg extending into said chamber; a film supply cartridge removably received in said chamber and comprising a mantle having a pair of stops whose position with reference to each other is indicative of the exact speed of film in said cartridge, one of said stops abutting against said leg in response to proper insertion of said cartridge into said chamber; a light meter provided in said housing and comprising a portion movable to and from a plurality of initial positions each of which is characteristic of a different film speed; and a transmission comprising a sensing element movably mounted in said housing and operatively connected with said movable portion, said element extending into the path of and being movable by the other of said stops to place said movable portion into such initial position which accurately reflects the speed of film in said cartridge when said leg abuts against said one stop.

4. In a camera, a housing defining a chamber; a locating member comprising a leaf spring mounted in said housing and having a plurality of legs extending into said chamber; a film supply cartridge removably received in said chamber and comprising a mantle having a pair of stops whose position with reference to each other is indicative of the exact speed of film in said cartridge, one of said stops abutting against said legs in response to proper insertion of said cartridge into said chamber and at least one of said legs also abutting against the other of said stops; a light meter provided in said housing and comprising a portion movable to and from a plurality of initial positions each of which is characteristic of a different film speed; and a transmission comprising a sensing element movably mounted in said housing and operatively connected with said movable portion, said element extending into the path of and being movable by said other stop to place said movable portion into such initial position which accurately reflects the speed of film in said cartridge when said legs abut against said one stop.

5. A structure as set forth in claim 4, wherein said spring comprises two legs of identical length and wherein said sensing element comprises a tip extending between said legs.

6. A structure as set forth in claim 5, wherein said sensing element is provided with means for guiding said legs.

7. In a camera, a housing defining a chamber; a locating means comprising a rigid substantially plate-like member tiltably mounted in said housing and having an end portion extending into said chamber, and biasing means for biasing said plate-like member in a direction to move said end portion deeper into said chamber; a film supply cartridge removably received in said chamber and comprising a mantle having a pair of stops spaced from each other by a distance which is indicative of the speed of film in said cartridge, one of said stops abutting against the end portion of said plate-like member in response to proper insertion of said cartridge into said chamber; a light meter provided in said housing and comprising a portion movable to and from a plurality of initial positions each of which is characteristic of a different film speed; and a transmission comprising a sensing element movably mounted in said housing and operatively connected with said movable portion, said element extending into the path of and being movable by the other of said stops to place said movable portion into such initial position which accurately reflects the speed of film in said cartridge when the end portion of said plate-like member abuts against said one stop.

8. A structure as set forth in claim 7, wherein said one stop has a substantially flat face which abuts against said end portion when the cartridge is properly inserted in said chamber and wherein said end portion moves in a plane which is substantially parallel to the plane of said flat face when said plate-like member is tilted by said biasing means.

9. A structure as set forth in claim 7, wherein said biasing means comprises a leaf spring, a portion of which is fixed to said housing and wherein said plate-like member is coupled to said spring.

10. A structure as set forth in claim 9, wherein said plate-like member is provided with a slot and wherein said portion of said leaf spring extends through said slot.

11. In a camera, a housing defining a chamber; a locating member mounted in said housing and extending into said chamber, said locating member consisting at least in part of resilient material and having an end portion movable in a predetermined plane; a film supply cartridge removably received in said chamber and comprising a mantle having a pair of stops whose position with reference to each other is indicative of the exact speed of film in said cartridge, one of said stops having a substantially flat face located in said predetermined plane and abutting against the end portion of said locating member in response to proper insertion of said cartridge into said chamber; a light meter provided in said housing and comprising a portion movable to and from a plurality of initial positions each of which is characteristic of a different film speed; and a transmission comprising a sensing element movably mounted in said housing and operatively connected with said movable portion, said element extending into the path of and being movable by the other of said stops to place said movable portion into such initial position which accurately reflects the speed of film in said cartridge when the end portion of said locating member abuts against the face of said one stop.

12. In a camera, a housing defining a chamber; a locating member consisting at least in part of resilient material, said locating member being mounted in said housing and extending into said chamber; a film supply cartridge removably received in said chamber and comprising a mantle having a pair of stops spaced from each other by a distance which is indicative of the speed of film in said cartridge, one of said stops abutting against said locating member in response to proper insertion of said cartridge into said chamber; a light meter provided in said housing and comprising a portion movable to and from a plurality of initial positions each of which is characteristic of a different film speed; and a transmission comprising a sensing element movably mounted in said housing and operatively connected with said movable portion, said element extending into the path of and being movable by the other of said stops to place said movable portion into such initial position which accurately reflects the speed of film in said cartridge when said locating member abuts against said one stop.

13. In a still camera, a housing defining an internal chamber and having a part movable with reference to the remainder thereof to expose said chamber; locating means consisting at least in part of resilient material and comprising an end portion extending into said chamber; a film supply cartridge comprising a mantle removably accommodated in said chamber, said mantle having a recess and including a flat shoulder bounding one side of said recess and abutting against the end portion of said locating means when the cartridge is properly inserted into said chambers, said mantle further comprising a stop located in said recess and having a face whose distance from said shoulder is indicative of the speed of film stored in said cartridge, said end portion of said locating means also abutting against a portion of said stop; an exposure meter provided in said housing and comprising a portion movable to and from a plurality of initial positions each of which is characteristic of a different film speed; and transmission means comprising a sensing element movably mounted in said housing and operatively connected with the movable portion of said exposure meter, said sensing element extending into the path of and being movable by the face of said stop to place the movable portion of said exposure meter into such initial position which accurately reflects the exact speed of film in said cartridge when the end portion of said locating means abuts against said shoulder in response to proper insertion of said cartridge into said chamber.

14. In a still camera, a housing defining an internal chamber and having a part movable with reference to the remainder thereof to expose said chamber; locating means consisting at least in part of resilient material and comprising an end portion extending into said chamber; a film supply cartridge comprising a mantle removably accommodated in said chamber, said mantle having a recess and including a flat shoulder bounding one side of said recess and abutting against the end portion of said locating means when the cartridge is properly inserted into said chamber, said mantle further comprising a stop located in said recess and having a face whose distance from said shoulder is indicative of the speed of film stored in said cartridge, said end portion of said locating means also abutting against a portion of said stop and said locating means being tiltable with reference to said housing so that said end portion thereof can move in a plane which coincides substantially with the plane of said shoulder when the cartridge is properly inserted into said chamber; an exposure meter provided in said housing and comprising a portion rotatable to and from a plurality of initial positions each of which is characteristic of a different film speed; and transmission means comprising a sensing element rotatably mounted in said housing and operatively connected with the rotatable portion of said exposure meter, said sensing element extending into the path of and being rotatable by the face of said stop to place the movable portion of said exposure meter into such initial angular position which accurately reflects the exact speed of film in said cartridge when the end portion of said locating means abuts against said shoulder in response to proper insertion of said cartridge into said chamber.

15. A structure as set forth in claim 14, wherein said sensing element comprises means for keeping the end portion of said locating means out of the path of said stop during insertion of said cartridge into said chamber.

References Cited

UNITED STATES PATENTS

| 2,186,613 | 1/1940 | Mihalyi | 95—31 XR |
| 3,025,777 | 3/1962 | Wilkenson | 95—10 |
| 3,212,421 | 10/1965 | Hackenberg | 95—31 |
| 3,266,395 | 8/1966 | Kremp et al. | 95—10 |
| 3,266,397 | 8/1966 | Kremp et al. | 95—31 |

FOREIGN PATENTS

| 1,296,960 | 5/1962 | France. |
| 864,803 | 1/1953 | Germany. |

NORTON ANSHER, *Primary Examiner.*

J. F. PETERS, *Assistant Examiner.*